United States Patent Office 3,712,923
Patented Jan. 23, 1973

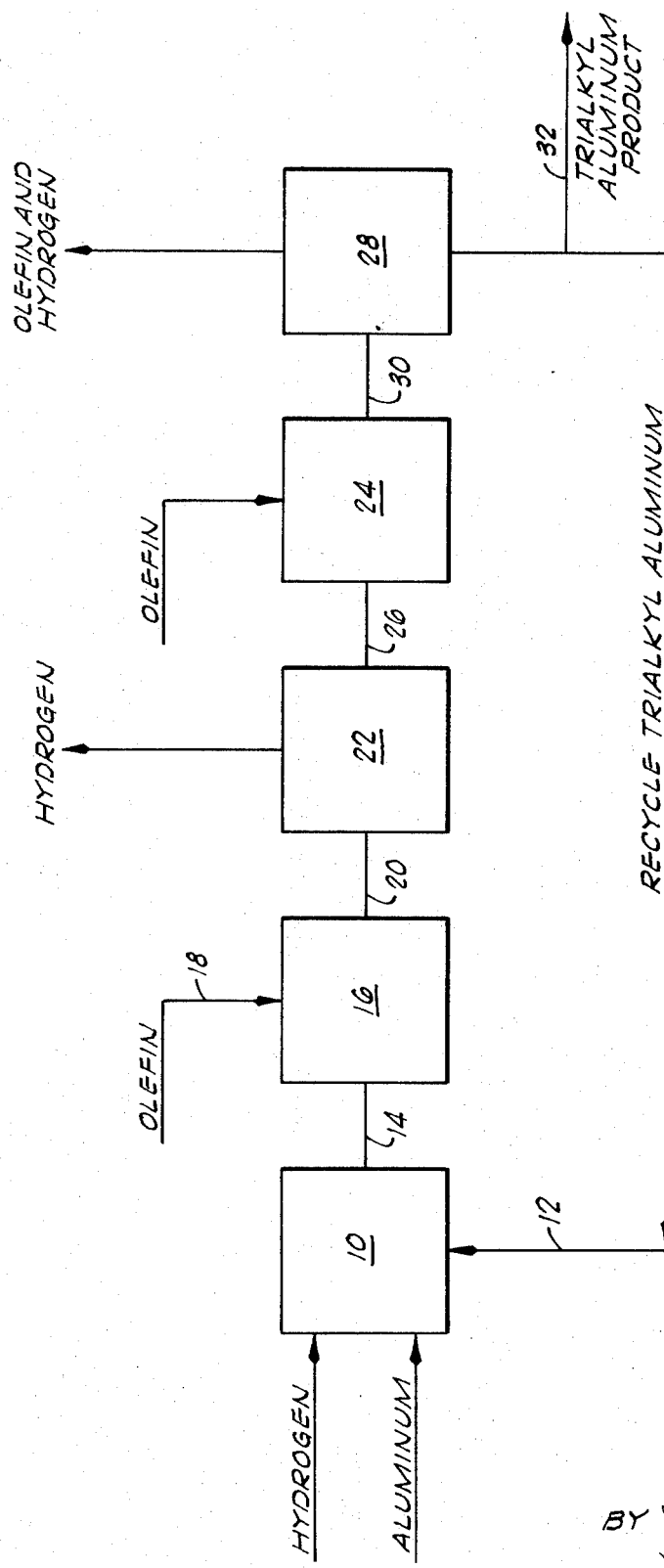

3,712,923
PROCESS FOR THE PRODUCTION OF TRIALKYL ALUMINUM COMPOUNDS
Kaye L. Motz and John Friend, Ponca City, Okla., assignors to Continental Oil Company, Ponca City, Okla.
Filed Jan. 18, 1971, Ser. No. 107,205
Int. Cl. C07f 5/06
U.S. Cl. 260—448 A          11 Claims

ABSTRACT OF THE DISCLOSURE

The present invention relates to an improved process for the production of trialkyl aluminum compounds using aluminum, hydrogen and olefinic materials as the reactants. By the present invention, a process is provided which minimizes the loss of aluminum due to the decomposition of the intermediate formed in the process, dialkyl aluminum hydride, resulting in improved yields of the end product, trialkyl aluminum. A trialkyl aluminum compound is reacted with aluminum metal and hydrogen at an elevated pressure to form an intermediate dialkyl aluminum hydride reaction product. The intermediate reaction product is reacted with an olefinic material at the elevated pressure so that a quantity of trialkyl aluminum is formed sufficient to reduce the concentration of the dialkyl aluminum hydride intermediate to a level equal to or slightly below the equilibrium concentration thereof that would exist at a reduced pressure. The pressure on the intermediate reaction product is then lowered to said reduced pressure and the intermediate reaction product is reacted with additional olefinic material to complete the formation of the trialkyl aluminum product.

BACKGROUND OF THE INVENTION

(1) Field of the invention

The present invention relates generally to a process for the production of trialkyl aluminum compounds, and more particularly, but not by way of limitation, to an improved process for the production of trialkyl aluminum compounds using aluminum, hydrogen and olefinic materials as the reactants.

(2) Background of the invention

The preparation of trialkyl aluminum compounds utilizing metallic aluminum, gaseous hydrogen, aluminum trialkyl and an olefin as starting materials is well known. For example, in U.S. Pat. No. 2,787,626, a process is described wherein an olefinic material, hydrogen and aluminum are charged to a single, common reaction vessel and trialkyl aluminum is yielded. More recently a process has been described in U.S. Pat. No. 3,016,393, in which aluminum, hydrogen and ethylene are introduced continuously into a reaction vessel and the product, triethyl aluminum, is removed continuously from the reaction zone.

In addition to the processes utilizing a single reactor, other processes have been proposed which utilize two or more reactors.

In general, the preparation of trialkyl aluminum compounds in all of the heretofore known production processes utilizing aluminum, hydrogen and olefinic materials as the reactants proceed via the following reactions:

(1)  $Al + 3/2 H_2 + 2 AlR_3 \rightarrow 3 AlR_2H$ (2)  $3 AlR_2H + 3 CH_2=CHR' \rightarrow 3 R_2AlCH_2CH_2R'$ where R is an alkyl radical and R' is an alkyl radical or hydrogen.

Although the dialkyl aluminum hydride intermediate produced in the initial reaction (Equation 1 above) is a fairly stable compound under normal conditions, the reaction is reversible, and the dialkyl aluminum hydride formed readily decomposes when the hydrogen pressure thereon is reduced yielding aluminum, hydrogen and aluminum trialkyl. As will be understood by those skilled in the art, the reduction of the pressure on the intermediate reaction product causes the equilibrium of the reaction to be shifted in a direction increasing decomposition of the hydride by reversal of the reaction. This decomposition reaction may be represented by the following equation:

(3)  $3 AlR_2H \rightarrow Al + 3/2 H_2 + 2 AlR_3$

An obvious disadvantage resulting from the decomposition of the dialkyl aluminum hydride intermediate is the reduction in the yield of the intermediate, and consequently, in the yield of the trialkyl aluminum final reaction product. Further, the metallic aluminum produced by the decomposition reaction does not contain those elements known to catalyze the formation of trialkyl aluminum hydride, e.g., zirconium, titanium, and hafnium. Thus, the aluminum generated from the decomposition of the hydride is inactive toward the preparation of additional hydride upon recycling to the first reaction, and therefore, constitutes a direct aluminum loss.

By the present invention, an improved process for the production of dialkyl aluminum hydride intermediate and trialkyl aluminum product is provided wherein the loss of aluminum due to the decomposition of the hydride is minimized and improved yields of the trialkyl aluminum product are realized.

SUMMARY OF THE INVENTION

The present invention relates to a continuous process for the production of trialkyl aluminum compounds having the structural formula $AlR_2R'$, where R and R' are alkyl groups containing 2 to 18 carbon atoms, which process comprises reacting a trialkyl aluminum compound having the structural formula $AlR_3$, where R has the meaning defined above, with aluminum metal and hydrogen at an elevated pressure of from about 20 atmospheres to about 500 atmospheres and at a reaction temperature of from about 100° C. to about 170° C. to form a dialkyl aluminum hydride intermediate reaction product. The intermediate reaction product is then reacted at the elevated pressure and temperature with a 1-olefinic material having the structural formula $$R''CH—CH_2$$

where R'' is selected from the class consisting of hydrogen and alkyl groups containing between 1 and 16 carbon atoms, and $R''CH—CH_2$ equals R' as defined above, so that a quantity of trialkyl aluminum having the formula $AlR_2R'$ is formed sufficient to reduce the concentration of the dialkyl aluminum hydride intermediate in the reaction product to a level equal to or slightly below the equilibrium concentration thereof that would exist at a reduced pressure of from about 20 atmospheres to about 35 atmospheres and a temperature of from 100° C. to about 170° C. The pressure on the intermediate reaction product is then reduced to the reduced pressure level specified above, and reacted with additional 1-olefinic material at said reduced pressure and temperature specified above to complete the formation of trialkyl aluminum product having the formula $AlR_2R'$.

It is, therefore, a general object of the present invention to provide an improved process for the production of trialkyl aluminum compounds.

A further object of the present invention is the provision of improved process for producing dialkyl aluminum hydride intermediate and trialkyl aluminum therefrom in which the equilibrium of the reversible reaction by which such hydride is produced is shifted in a direction favoring improved yields of the hydride and the trialkyl aluminum end product and, conversely, decreasing decomposition of the hydride by reversal of the reaction.

Yet a further object of the present invention is to reduce the extent to which the dialkyl aluminum hydride intermediate is decomposed, and as a result thereof, inert aluminum produced.

Still a further object of the present invention is to improve the yield of trialkyl aluminum compounds when such compounds are produced by the reactions heretofore described.

In addition to the foregoing objects and advantages, other objects and advantages will become apparent upon a reading of the following detailed description of the invention taken in conjunction with the accompanying drawing.

BRIEF DESCRIPTION OF THE DRAWING

In the drawing, apparatus which may be utilized in practicing the process of the present invention is illustrated schematically.

DESCRIPTION OF THE PREFERRED EMBODIMENTS

Broadly, the present invention comprises producing trialkyl aluminum compounds by the process of initially charging aluminum, hydrogen gas, and an aluminum trialkyl compound to a first reaction vessel wherein dialkyl aluminum hydride is produced according to the reaction:

(1) 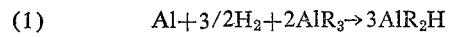 $Al + 3/2 H_2 + 2 AlR_3 \rightarrow 3 AlR_2H$ in which R is an alkyl group containing between 2 and 18 carbon atoms. The pressure which is utilized in the first reaction vessel to produce the dialkyl aluminum hydride intermediate is an elevated pressure of from about 20 to about 500 atmospheres, and the reaction temperature is from about 100° C. to about 170° C.

The hydride intermediate is continuously removed from the first reaction vessel and transferred to a second reaction vessel wherein it is contacted at the elevated pressure specified above with a 1-olefinic material to produce a quantity of trialkyl aluminum compound according to the reaction:

(2) 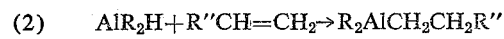 $AlR_2H + R''CH=CH_2 \rightarrow R_2AlCH_2CH_2R''$ where R has the meaning hereinbefore defined and R'' is selected from the class consisting of hydrogen and alkyl groups containing 1 and 16 carbon atoms. The trialkyl aluminum compound so produced may be more simply written $AlR_2R'$, where $R'$ is made equivalent to $-CH_2CH_2R''$.

The reaction in the second reaction vessel represented by Equation 2 above, is controlled so that a quantity of trialkyl aluminum is formed sufficient to reduce the concentration of the dialkyl aluminum hydride in the reaction product to a level equal to or slightly below the equilibrium concentration thereof that would exist at a reduced pressure of from about 20 atmospheres to about 35 atmospheres at a temperature of from about 100° C. to about 170° C. In other words, the equilibrium of the reversible reaction by which the dialkyl aluminum hydride is produced, is shifted in a direction which brings about a decrease of decomposition of the hydride by reversal of the reaction upon reducing the hydrogen pressure thereon. The reaction product from this reaction is continuously removed from the second reaction vessel and transferred to a third reaction vessel where it is contacted with an 1-olefinic material at the above described reduced pressure and temperature to produce additional trialkyl aluminum product in accordance with the reaction represented by Equation 2 above. By taking the reaction to completion in a third stage at a reduced pressure, excessive hydrogenation of the olefinic reactant does not take place, and undesirable polymerization reactions are reduced to a minimum.

Examples of trialkyl aluminum compounds which may be utilized in the reaction (1) are triethyl aluminum, tripropyl aluminum, tributyl aluminum, tripentyl aluminum, triisopropyl aluminum, trihexyl aluminum, tri-3-methyloctyl aluminum, trinonyl aluminum, tri-4-methyl-3-ethyldecyl aluminum, tridodecylaluminum, tripentadecylaluminum, tri-6-butyltetradecyl aluminum, and trioctadecylaluminum.

Examples of suitable olefinic materials having the structural formula $R''CH=CH_2$ as defined above include, but are not limited to ethylene, propylene, 1-butene, 1-pentene, 1-hexene, 1-heptene, 1-octene, 2-ethyl-1-butene, 4-hexyl-1-nonene, 2,2-diethyl-1-decene; 1-eicosene, 1-tridecene, 1-hexadecene and 2,3-dibutyl-1-octene.

Referring to the drawing, reference numeral 10 designates a first reaction vessel to which gaseous hydrogen, finely divided metallic aluminum including catalyst and a trialkyl aluminum compound of the type hereinbefore described are charged. In practice of the invention to produce a trialkyl aluminum compound which is characterized as having each of the alkyl groups bonded to the aluminum of identical character, a portion of the trialkyl aluminum product may be recycled to the first reaction vessel 10 by way of a suitable conduit 12 since there is a net gain of trialkyl aluminum produced in the process. In some instances, however, the trialkyl aluminum product resulting from the process of the invention may contain molecularly differing alkyl groups, in which case, a trialkyl aluminum compound having identical alkyl groups conforming to the structural formula $AlR_3$ as defined above, must be charged to the reaction vessel 10 from an independent source, since the trialkyl aluminum product does not conform to the specific structure of the reactant.

The trialkyl aluminum compound may be charged to the reaction vessel 10 without solution in a solvent. However, due to the pyrophoric nature of this compound, it is preferred to dissolve the compound in an inert hydrocarbon solvent, such as naphtha, kerosene, octane, toluene, etc.

The conditions employed in the first reaction vessel 10 for the production of the dialkyl aluminum hydride intermediate are in the range of from 20 to 500 atmospheres, and preferably between 40 and 150 atmospheres. The temperature in the reaction vessel 10 is maintained in the range of from 100° C. to 170° C., with the range of 110° C. to 140° C. being preferred. The metallic aluminum which is introduced to the first reaction vessel 10 is in finely sub-divided form and generally ranges in particle size from about 3 microns to about ⅛ of an inch. A suitable procedure for preparing the aluminum is to ballmill the aluminum for from 5 to 10 hours in a 10% solution of trialkyl aluminum in an inert hydrocarbon solvent. The aluminum charged to the first reaction vessel 10 also contains a reaction-promoting amount of one or more metals known to catalyze the formation of trialkyl aluminum hydride, e.g., zirconium, titanium and hafnium.

The dialkyl aluminum hydride intermediate produced by the reaction occurring in the first reaction vessel 10 is continuously removed and passed through a suitable conduit 14 to a second reaction vessel 16. A quantity of 1-olefinic material is conducted to the reaction vessel 16 through a suitable conduit 18. The pressure and temperature conditions employed in the second reaction vessel 16 are substantially the same as the pressure and temperature conditions employed in the first reaction vessel 10. The reaction taking place in the reaction vessel 16, represented by the Equation 2 above, is controlled by limiting the quantity of olefinic material entering the reaction vessel 16 through conduit 18 so that only sufficient trialkyl aluminum is formed to reduce the concentration of the dialkyl aluminum hydride in the reaction product to a level equal to or slightly below the equilibrium concentration thereof that would exist at a reduced pressure of from 20 atmospheres to about 35 atmospheres at a temperature of from about 100° C. to about 170° C.

The reaction product from the second reaction vessel 16 is continuously passed through a suitable conduit 20 to a flash tank 22 in which the hydrogen pressure on the reaction product is lowered to the conditions mentioned above, i.e., from about 20 atmospheres to about 35 atmospheres. The temperature of the reaction product entering the flash tank 22 is maintained in approximately the same range as that which is utilized in the first and second reaction vessels 10 and 16. When the pressure is reduced on the reaction product from the second reaction vessel 16, little or no decomposition of the dialkyl aluminum hydride remaining in the reaction product takes place since, as described above, the equilibrium of the dialkyl aluminum hydride reaction is shifted in the second reaction vessel 16.

From the flash tank 22, the reaction product is next passed into a third reaction vessel 24 through a suitable conduit 26. While within the third reaction vessel 24, the dialkyl aluminum hydride reaction product is contacted with additional 1-olefinic material at the reduced pressure to yield additional trialkyl aluminum product according to Equation 2 above. As will be understood, by selection of the 1-olefinic material introduced to the second and third reaction vessels 16 and 24 respectively, the molecular character of the trialkyl aluminum compound which is produced may be varied. When an olefinic material is employed which corresponds, except for its unsaturation, to the alkyl substituents of the trialkyl aluminum compound charged to the first reaction vessel 10, the trialkyl aluminum product produced in the second and third reactors is a compound in which the alkyl substituents of the aluminum atom are identical. In this eventuality, a portion of the trialkyl aluminum product may be recycled to the first reaction vessel 10 via the conduit 12, such portion being used to supply the necessary quantity of trialkyl aluminum reactant used in the first reaction.

From the third reaction vessel 24, the crude trialkyl aluminum product is passed along with excess olefin and hydrogen gas into a second flash tank 28 via a conduit 30. In the flash tank 28, the excess olefin and hydrogen are flashed from the trialkyl aluminum product and the product is then removed and conducted to suitable purification apparatus through a conduit 32.

As described above, the dialkyl aluminum hydride intermediate reaction product is contacted in the third reaction vessel 24 under a reduced hydrogen partial pressure of from 20 to 35 atmospheres. At this pressure, the hydrogenation of substantial portions of the olefin reactant which is charged to the reaction vessel 24 does not take place. This is, of course, in contrast to the appreciable quantity of olefin which would be hydrogenated if the entire charge of the olefin required to carry the trialkyl aluminum formation reaction to completion were introduced directly into the first reaction vessel where high hydrogen pressures are required. Further, at the reduced pressure maintained in the third reaction vessel 24, excessive polymerization or growth of the trialkyl aluminum product does not take place.

The process of the invention may be further illustrated by the following examples:

EXAMPLE 1

In the laboratory, a 1-liter autoclave was charged with 420 ml. of triethyl aluminum and 54 grams of ball-milled aluminum slurried in 32 grams of 10% triethyl aluminum in kerosene. Hydrogen was introduced to the autoclave to a pressure of 35 atmospheres and the mixture was heated to 132° C. Upon reaching the temperature of 132° C., the hydrogen pressure was increased to 83 atmospheres. The mixture was held at the conditions of 83 atmospheres and 132° C. for a period of 3 hours at which time a sample was taken from the autoclave and analyzed.

A quantity of ethylene (calculated to be the amount required to reduce the diethyl aluminum hydride concentration in the reaction product to the equilibrium concentration thereof at the reduced pressure of 28.2 atmospheres and a temperature of 130° C.) was next introduced to the autoclave and the pressure increased to approximately 117 atmospheres as a result thereof. After one minute the temperature increased to 144° C., and the pressure decreased to 95 atmospheres. The autoclave was depressured to 65.5 atmospheres and then to 28.2 atmospheres and samples were taken and analyzed at both pressure levels. The data obtained from such analyses are tabulated in Table I below:

TABLE I

| Time (minutes) | Autoclave pressure, atmospheres | Autoclave temperature, ° C. | Diethyl aluminum hydride concentration, mole percent |
| --- | --- | --- | --- |
| Initial | 83 | 133 | 83.6 |
| 0 | 117.6 | 133 | |
| 1 | 95.0 | 144 | |
| 4 | 65.5 | 143 | 71.0 |
| 5 | 28.2 | 140 | |
| 16 | 28.2 | 132 | |
| 64 | 28.2 | 131 | 71.0 |

From the above, it may be seen that the concentration of diethyl aluminum hydride dropped rapidly upon the addition of ethylene to the autoclave indicating a rapid alkylation of the hydride to trialkyl aluminum.

EXAMPLE 2

The laboratory experiment of Example 1 was repeated except that the step of adding ethylene to the autoclave was omitted. The results of the analyses are tabulated in Table II.

TABLE I

| Time (minutes) | Autoclave pressure, atmospheres | Autoclave temperature, ° C. | Diethyl aluminum hydride concentration, mole percent |
| --- | --- | --- | --- |
| Initial | 83.0 | 133 | 80.0 |
| 0 | 28.2 | 133 | 79.9 |
| 3 | 28.2 | 133 | 77.5 |
| 6 | 28.2 | 133 | 76.5 |
| 9 | 28.2 | 133 | 74.6 |
| 60 | 28.2 | 133 | 71.4 |
| 120 | 28.2 | 133 | 70.1 |
| 180 | 28.2 | 133 | 70.0 |

From the above data, it may be seen that diethyl aluminum hydride intermediate formed in the initial reaction in the autoclave decomposed when the pressure was reduced thereby generating aluminum.

It is to be understood, that while a preferred embodiment of the invention has been described in detail, various changes can be made without departing from the spirit and scope of the invention as defined by the appended claims.

What is claimed is:

1. In a process for producing an alkyl aluminum compound comprising combining aluminum metal, hydrogen and a trialkyl aluminum; allowing the combination to react at an elevated pressure in the range of about 20–500 atmosphere and a temperature in the range of about 100–170° C. to produce dialkyl aluminum hydride, reducing the pressure and adding a 1-olefinic material to produce trialkyl aluminum compound, the improvement of adding a first portion of the 1-olefinic material at an elevated pressure in the range of about 20–500 atmospheres before the pressure is reduced and adding the balance of the 1-olefinic material at reduced pressure to reduce loss of aluminum metal from the process.

2. A process of claim 1 in which the trialkyl aluminum compound is a compound or mixture of compounds selected from compounds having the formula $AlR_2R'$, where R and R' are alkyl groups containing about 2–18 carbon atoms and in which the 1-olefinic material is a material or mixture of materials having the formula R"CH=CH₂, where R" is selected from hydrogen and alkyl groups containing about 1–16 carbon atoms.

3. A process of claim 1 wherein the first portion of 1-olefinic material added is sufficient to reduce the concentration of the dialkyl aluminum hydride to a level about equal to the equilibrium concentration thereof that would exist at the reduced pressure.

4. A process of claim 1 in which the reduced pressure is in the range of about 20–35 atmospheres.

5. A process of claim 1 in which a portion of the trialkyl aluminum from the reaction is recycled.

6. A process of claim 6 in which the trialkyl aluminum compound is a compound selected from compounds having the formula AlR₂R', where R and R' are alkyl groups containing about 2–18 carbon atoms and in which the 1-olefinic material is a material having the formula $$R"CH=CH_2$$

where R" is selected from hydrogen and alkyl groups containing 1–16 carbon atoms and the 1-olefinic material radical has the same number of carbon atoms as the R' alkyl radical.

7. A process of claim 6 in which each of the alkyl groups, R and R', is independently selected from the alkyl radicals ethyl, propyl, butyl, pentyl, isopropyl, hexyl, 3-methyl-octyl, nonyl, 4-methyl-3-ethyl-decyl, dodecyl, pentadecyl, 6-butyltetradecyl and octadecyl.

8. A process of claim 6 in which the 1-olefinic material, R"CH=CH₂, is selected from ethylene; propylene; 1-butene; 1-pentene; 1-hexene; 1-heptene; 1-octene; 2-ethyl-1-butene; 4-hexyl-1-nonene; 2,2-diethyl-1-decene; 1-eicosene; 1-tridecene; 1-hexadecene and 2,3-dibutyl-1-octene.

9. A process of claim 2 in which the trialkyl aluminum compound is triethyl aluminum, the dialkyl aluminum hydride is diethyl aluminum hydride and the 1-olefinic material is ethylene.

10. A process of claim 9 in which a portion of the triethyl aluminum from the combination is recycled to form diethyl aluminum hydride.

11. A continuous process for the production of an alkyl aluminum compound of the formula AlR₂R', where R and R' are alkyl groups independently selected from alkyl groups containing 2–18 carbon atoms which process comprises reacting a trialkyl aluminum compound having the structural formula AlR₃ where R is defined as above with aluminum metal and hydrogen at an elevated pressure in the range from about 20 atmospheres to about 500 atmospheres and at a reaction temperature in the range of from 100° C. to about 170° C. to form a dialkyl aluminum hydride reaction product, reacting said dialkyl aluminum hydride reaction product at said elevated pressure and temperature with a 1-olefinic material having the structural formula R"CH=CH₂, where R" is selected from hydrogen and alkyl groups containing 1–16 carbon atoms and R"CH₂—CH₂— corresponds to R' as defined above so that a quantity of trialkyl aluminum having the formula AlR₂R' is formed sufficient to reduce the concentration of dialkyl aluminum hydride in the reaction product to a level equal to or slightly below the equilibrium concentration thereof that would exist at a reduced pressure in the range of from about 20 atmospheres to about 35 atmospheres and a temperature in the range of from about 100° C. to about 170° C., reducing the pressure of said reaction product to a reduced pressure in said reduced pressure range, and reacting said reaction product at said reduced pressure with 1-olefinic material at a temperature in the range of from about 100° C. to about 170° C. to form trialkyl aluminum product having the formula AlR₂R' where R and R' are defined as above.

References Cited

UNITED STATES PATENTS 3,207,770  9/1965  Ziegler et al. _____ 260—448 A
3,207,770  9/1965  Ziegler et al. _____ 260—448 A

OTHER REFERENCES

Chemical Abstracts, vol. 63, 13314h (1965), (corresponding French No. 1384907).

HELEN M. S. SNEED, Primary Examiner